United States Patent [19]

Doke et al.

[11] Patent Number: 4,795,025
[45] Date of Patent: Jan. 3, 1989

[54] PARTS FEEDING APPARATUS OF THE PIEZOELECTRIC DRIVE TYPE

[75] Inventors: Hiroshi Doke; Naruyoshi Tuboi; Yoshihisa Sasaki; Shigeo Ozawa, all of Mie, Japan

[73] Assignee: Kabushiki Kaisha Toshiba, Kawasaki, Japan

[21] Appl. No.: 871,491

[22] Filed: Jun. 6, 1986

[30] Foreign Application Priority Data

Jun. 28, 1985 [JP] Japan .................. 60-143109
Jun. 28, 1985 [JP] Japan .................. 60-143110
Jun. 28, 1985 [JP] Japan .................. 60-143111
Jun. 29, 1985 [JP] Japan .................. 60-142848

[51] Int. Cl.$^4$ .......................................... B65G 27/08
[52] U.S. Cl. ................................. 198/763; 198/766
[58] Field of Search ............... 198/763, 766; 74/155

[56] References Cited

U.S. PATENT DOCUMENTS

| | | | |
|---|---|---|---|
| 2,243,936 | 6/1941 | Wurzbach et al. | 198/763 |
| 2,951,581 | 9/1960 | Long et al. | 198/763 |
| 3,447,671 | 6/1969 | Schweinfurth | 198/763 |
| 3,627,112 | 2/1971 | Smith | 198/220 |
| 3,700,094 | 10/1972 | Parr | 198/220 |
| 3,729,090 | 4/1973 | Hacker | 198/763 |
| 3,915,292 | 10/1975 | Brown | 198/763 |

FOREIGN PATENT DOCUMENTS

| | | |
|---|---|---|
| 1506913 | 7/1969 | Fed. Rep. of Germany . |
| 5261087 | 10/1930 | Japan . |
| 5746517 | 8/1955 | Japan . |
| 47-6425 | 4/1972 | Japan . |
| 810971 | 3/1959 | United Kingdom . |

Primary Examiner—Dennis L. Taylor
Attorney, Agent, or Firm—Foley & Lardner, Schwartz, Jeffery, Schwaab, Mack, Blumenthal & Evans

[57] ABSTRACT

A parts feeding apparatus of the piezoelectric drive type consists of a base, a plurality of bimorph cell assemblies each including a leaf spring the lower end of which is fixed to the base and two piezoelectric elements each fixed on respective sides of each leaf spring to vibrate each leaf spring when AC voltage is applied to the piezoelectric elements, and a conveyor connected with the lower end of each connecting member. Furthermore, the upper end of each bimorph cell assembly is connected with the lower end of each connecting member so that the vibration of each bimorph cell assembly is transmitted to the conveyor to feed articles placed on it. Each connecting member has lower bending stiffness than each leaf spring by forming one or more semicircular cut-out portions in it or selecting its thickness or its material so that an external force acting on each piezoelectric element in vibration is decreased.

12 Claims, 10 Drawing Sheets

PARTS FEEDING APPARATUS OF THE PIEZOELECTRIC DRIVE TYPE

BACKGROUND OF THE INVENTION

1. Field of the Invention

This invention relates to a parts feeding apparatus of the piezoelectric drive type which employs piezoelectric elements as a drive source of a conveying means for feeding relatively small machine parts, electric elements or the like.

2. Description of the Prior Art

Figure 20:
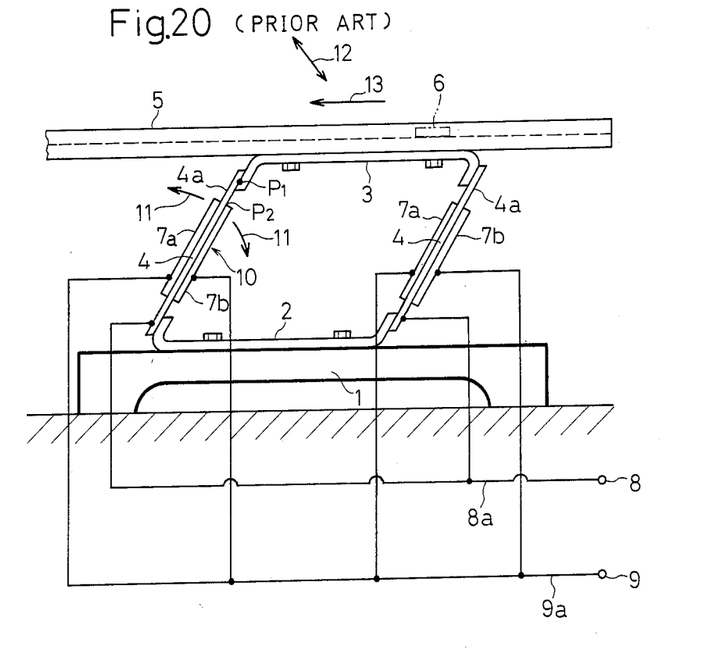
FIG. 20 is a side view of prior art parts feeder of the piezoelectric drive type.

Parts feeders employing piezoelectric elements as a drive source are disclosed by Japanese Utility Model Japanese Utility Model Unexamined Application Nos. 52-61087 and 57-46517. With reference to FIG. 20 illustrating the general construction of such prior art parts feeder of the piezoelectric drive type, lower ends of two leaf springs 4 are connected with ends of a lower frame 2 fixed to a base 1. Upper ends 4a of the leaf springs 4 are connected with an upper frame 3. The leaf springs 4 are inclined and parallel to each other. A trough 5 as a conveying means is mounted on the upper frame 8 and article 6 such as machine parts to be conveyed are placed thereon. Two rectangular piezoelectric elements 7a and 7b are provided on respective sides of each leaf spring 4. AC voltage supplied to terminals 8 and 9 is applied to the piezoelectric elements 7a and 7b through leads 8a and 9a.

Each bimorph cell assembly 10 as a vibration generator thus comprises a leaf spring and two piezoelectric elements 7a and 7b fixed thereto. When AC voltage is applied to each of the piezoelectric elements 7a and 7b, one piezoelectric element 7a expands in a positive half cycle and contracts in a negative half cycle to thereby induce strain movement. The other piezoelectric element 7b is adapted to contract in the positive half cycle and expand in the negative half cycle. For example, where two piezoelectric elements 7a and 7b are fixed to the leaf spring 4 so as to have opposite polarity to each other at outer sides thereof and further where the leads 8a and 9a are wired such that AC voltage having the same polarity is applied to each of the piezoelectric elements 7a and 7b, one piezoelectric element 7a expands while at the same time the other piezoelectric element 7b contracts. The strain movement of the piezoelectric elements 7a and 7b causes the flexure movement to the leaf spring 4 to vibrate it in the direction of arrow 11 in FIG. 20, thereby vibrating the trough 5.

The parts feeder of the piezoelectric drive type is smaller in size and simpler in construction than those of electromagnetic drive type and electric motor drive type, so that it provides easy operation and repair. Furthermore, the piezoelectric drive type parts feeder surpasses those of the other types in consumption of electricity and noise. On the other hand, it has some problems on the point of feeding efficiency: In the above-described piezoelectric drive type parts feeder, application of AC voltage to the piezoelectric elements 7a and 7b causes the elements 7a and 7b to bend with the leaf spring 4, which movement vibrates the trough 5 connected with the free end 4a of each leaf spring 4 obliquely up and down as shown by arrow 12 in FIG. 20, thereby feeding the articles 6 in the direction of arrow 13 along the trough 5. In this case, the speed at which the articles are conveyed is proportionate to the vibration amplitude of the trough 5.

Figure 21:
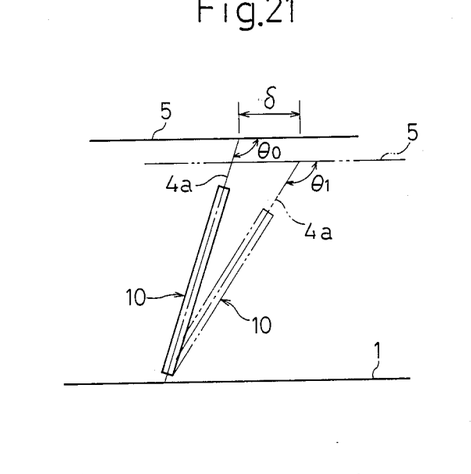
FIG. 21 is a diagram illustrating vibration generated by the bimorph cell assembly employed in the parts feeder in FIG. 20.

Reference symbol "δ" in FIG. 21 denotes displacement of each free end 4a of the leaf spring 4 (connection with the trough 5) when each bimorph cell assembly 10 suffers deformation by application of AC voltage thereto. The displacement δ is shown by the following expression (1):

$$\delta = (3/2)(d \cdot V/t^2)\{ + (\sigma/t)\} l^2 \cdot a \qquad (1)$$

where d = piezoelectric strain constant

Figure 22:
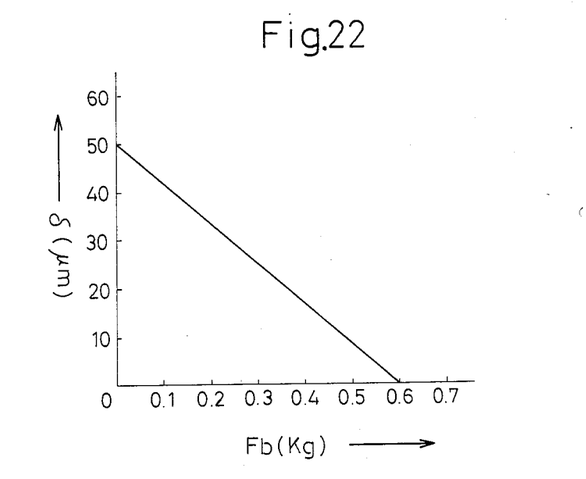
FIG. 22 is a graph illustrating displacement-load characteristics of the bimorph cell assembly in FIG. 20 in the case of application of DC voltage to the piezoelectric elements.

V = voltage applied to piezoelectric elements
t = thickness of bimorph cell assembly
l = effective length of leaf spring
σ = thickness of leaf spring
a = non-linear coefficient The amount of displacement of each bimorph cell assembly 10 is decreased when an external force acts on the free end 4a of each leaf spring 4 in the opposite direction to that of displacement of each bimorph cell assembly 10. The amount of displacement δ becomes zero when the external force reaches a bound load Fb shown by the following expression (2):

$$Fb = (\tfrac{1}{4})(\omega \cdot t^2/l^3)\sigma \cdot E \qquad (2)$$

where E = width of bimorph cell assembly
E = Young's modulus where the value of applied voltage is zero FIG. 22 illustrates measured results about the relation between displacement δ of the bimorph cell assembly 10 and the bound load Fb in the case where DC voltage (100 V) is applied to the piezoelectric elements 7a and 7b. It is known in the art that the resonance increases the amount of displacement δ by ten times or more than that in non-resonance when AC voltage applied to the piezoelectric elements 7a and 7b has the same frequency as the natural frequency of the bimorph cell assembly 10. The value of the bound load Fb, however, does not change, whether the resonant frequency is selected or not.

The vibration frequency rapidly decreases when a load acts on the bimorph cell assembly 10, so that it is necessary for the load not to be applied to the free ends 4a of the leaf spring 4.

3. Defects of the Prior Art

Since the bimorph cell assemblies 10 of the parts feeder shown in FIG. 20 have the same length and are placed in parallel to each other, the trough 5 is not allowed to be inclined even when each bimorph cell assembly 10 vibrates right and left. In this case, the trough 5 cannot but vibrate obliquely up and down, keeping its horizontal state. As a result, an external bending force acts on the connection where each leaf spring 4 is connected with the upper frame 3 supporting the trough 5. That is, in FIG. 21, the angle formed by each leaf spring 4 and the trough 5 necessitates changing from $\theta_o$ to $\theta_1$ when application of voltage to the piezoelectric elements 7a and 7b moves each bimorph cell assembly 10 from the initial position shown by the solid line to a position shown by the chain line. If this angular change is not allowed, a bending stress as load acts on each bimorph cell assembly 10. When the bending stress increases above the bound load Fb, the trough 5 cannot be vibrated.

The speed V at which the articles 6 are conveyed depends on displacement δ of the trough 5 and is denoted by the following expression (8):

$$V = (\delta \times fn)\eta \qquad (3)$$

where
fn=vibration frequency
η=conveying efficiency

Figure 23:
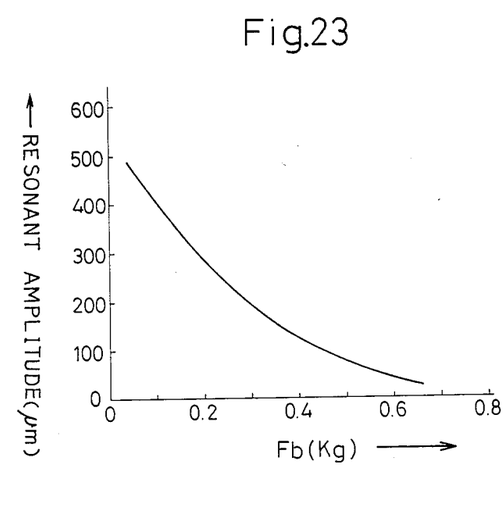
FIG. 23 is a graph similar to FIG. 22 in the case of application of AC voltage to the piezoelectric elements.

Even when the resonant frequency is selected as the vibration frequency fn, the vibration amplitude is decreased with increase of load applied to the free ends 4a of the leaf springs 4 as shown in FIG. 23.

In the prior art parts feeder of the piezoelectric drive type, each leaf spring 4 has high stiffness in the portion between the point where the trough 5 is connected with the leaf spring 4 (point P1 in FIG. 20) and the upper end of each of the piezoelectric elements 7a and 7b (point P2 in FIG. 20). Accordingly, a large force acts on each bimorph cell assembly 10 in vibration. Consequently, the vibration amplitude of each bimorph cell assembly 10, that is, that of the trough 5 is decreased, which makes it impossible to obtain the conveying speed for practical use. The prior art parts feeder thus necessitates improvements: the load acting on each bimorph cell assembly 10 needs decreasing and the vibration amplitude of each bimorph cell assembly 10 needs increasing. Furthermore, a means is required for effectively transmitting the vibration with increased amplitude from each bimorph cell assembly to the trough.

SUMMARY OF THE INVENTION

It is, therefore, an object of this invention to provide an improved parts feeding apparatus of the piezoelectric drive type in which the conveying speed for practical use is ensured by decreasing the load applied to the piezoelectric elements so as to prevent vibration thereof and by increasing the vibration amplitude of the conveying means.

According to this invention, the piezoelectric drive type parts feeding apparatus is characterized in that elastic members are provided for connecting the conveying means and respective elastic plates of the bimorph cell assemblies therewith. Each elastic connecting member may be formed integrally with respective elastic plates of the bimorph cell assemblies or not. Each elastic connecting member has lower bending stiffness than each elastic plate. Elastic deformation of each connecting member allows an angle formed by each vibration generator and the conveying means to be changed by application of small force, so that the load applied to each piezoelectric element is decreased, thereby increasing the vibration amplitude of the conveying means.

In the above-described construction, decreasing the bending stiffness of each elastic connecting member is attained by using a material having low Young's modulus, selecting the thickness of each connecting member or providing one or more cut-out portions with each connecting member.

Other and further objects of this invention will become obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

In the accompanying drawings.

DESCRIPTION OF PREFERRED EMBODIMENTS

Figure 1:
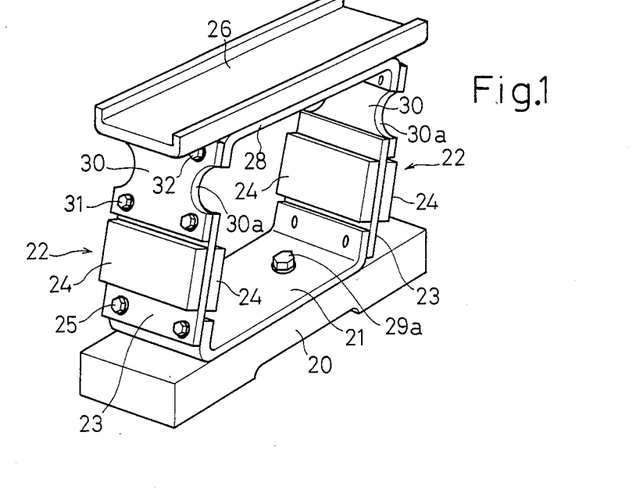
FIG. 1 perspective view of a parts feeder embodying this invention.
Figure 2:
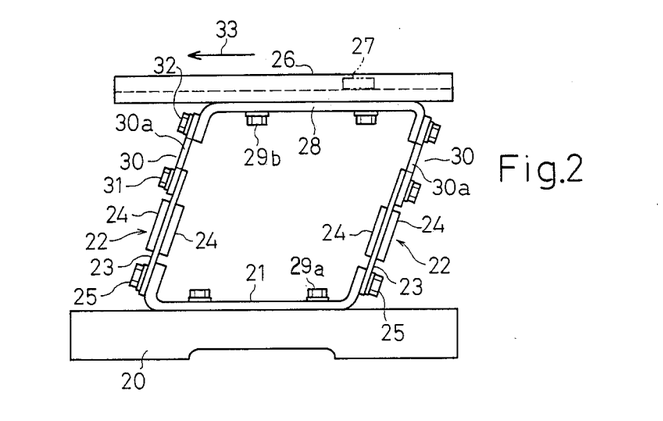
FIG. 2 is a side view of the parts feeder in FIG. 1.

First Embodiment (See FIGS. 1-3):

Referring to FIGS. 1 and 2 illustrating a first embodiment of this invention, a lower frame 21 is secured to the upper side of a base 20 by means of screws 29a. Two bimorph cell assemblies 22 each as a vibration generator are supported by the lower frame 21. Each bimorph cell assembly 22 comprises an elastic plate 23 such as a leaf spring or plastic plate and two rectangular piezoelectric elements 24 rigidly fixed on respective sides of the elastic plate 23 by adhesive such as epoxy resin. Each piezoelectric element 24 is made of piezoelectric ceramics such as a lead zirconate-titanate, usually called "PZT."

Figure 3:
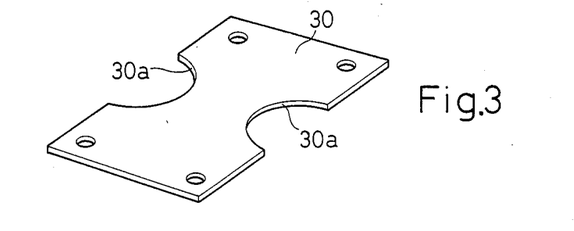
FIG. 3 is a perspective view of an elastic connecting member employed in the parts feeder in FIG. 1.

The lower frame 21 is connected with the lower end of each elastic plate 28 by screws 25. A trough 26 as a conveying means, which is adapted to be vibrated to linearly convey articles 27 such as machine parts placed thereon, is secured to &he upper frame 28 at the underside. The upper end of the elastic plate 23 of each bimorph cell assembly 22 and the upper frame 28 are connected with each connecting member 30 made of elastic material by screws 31 and 82. In this embodiment, each connecting member 30 has two semicircular cut-out portions 30a on both sides thereof respectively, as shown in FIG. 3. The bending stiffness of each connecting member 30 in the vicinity of the portions 30a is three-tenths to nine-tenths of that of each elastic plate 23(cross sectional secondary moment ratio).

AC voltage having the same frequency as the natural frequency of the vibration system including each connecting member 30 is applied to the piezoelectric elements 24, thereby vibrating the trough 26 obliquely up and down to convey the articles 27 in the direction of arrow 83 in FIG. 2.

According to the above-described arrangements, each connecting member 30 has a lower bending stiffness in the vicinity of the semicircular cut-out portions 80a than the elastic plate 23. Consequently, the change of angle formed by each bimorph cell assembly 22 and the trough 26 (corresponding to the change from $\theta_0$ to $\theta_1$ FIG. 21) is allowed under a condition where a small force acts on the semicircular cut-out portions 30a of each connecting member 30, thereby decreasing the extent in which the load causing the angular change acts on each piezoelectric element 24. As shown in FIGS. 22 and 23, the vibration amplitude of each piezoelectric element 24 is increased to a large extent, which brings about increase of speed at which the articles are conveyed, that is, the improvement of feeding efficiency of the parts feeder.

In relation to the bending stiffness of the connecting member 30, a force Fi required for each connecting member 30 to suffer deformation corresponding to the vibration amplitude $\delta$ (equivalent to $\delta$ in FIG. 21) is shown by the following expression (4) in case the connecting member 30 is taken for a cantilever:

$$Fi = 3E \cdot I \cdot \delta / L^3 \quad (4)$$

where
E=Young's modulus of the connecting member
I=cross sectional secondary moment of the connecting member
L=length of deformed portion Either the cross sectional secondary moment I must be decreased or the length of deformed portion must be increased in order that the force Fi, that is, the bending stiffness of the connecting member 30 may be decreased. In the latter case, the height of the parts feeder increases and accordingly the natural frequency of the parts feeder is reduced. As a result, the conveying speed is decreased. The cross sectional secondary moment I of the connecting member 30 is shown by the following expression (5):

$$I = b \cdot h^3 / 12 \quad (5)$$

where
b=width of the connecting member
thickness of the connecting member

As evident from the expression (5), the cross sectional secondary moment I of the connecting member 30 can be reduced by decreasing the width of the connecting member 30. In this embodiment, the width of the connecting member 80 is substantially decreased by forming semicircular cut-out portions 30a thereof.

Figure 24:
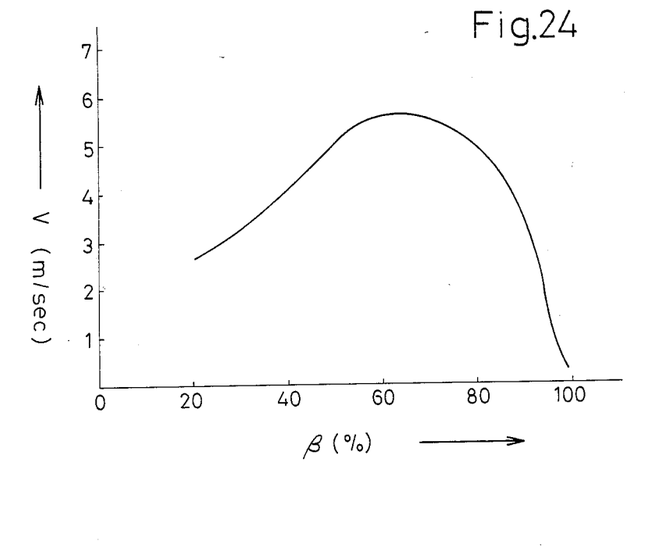
FIG. 24 is a graph illustrating a relation between the stiffness of the bimorph cell assembly and the conveying speed.

FIG. 24 illustrates measured results about the relation between the conveying speed V and the ratio $\beta$ of the cross sectional secondary moment $I_S$ of the connecting member 30 to the cross sectional secondary moment $I_B$ of the elastic plate 23. FIG. 24 shows that the conveying speed rapidly decreases under a condition where the ratio $\beta$ is 0.9 (=90%) or more and that the conveying speed gradually decreases under a condition where the ratio $\beta$ is 0.5 (=50%) or below.

Figure 25:
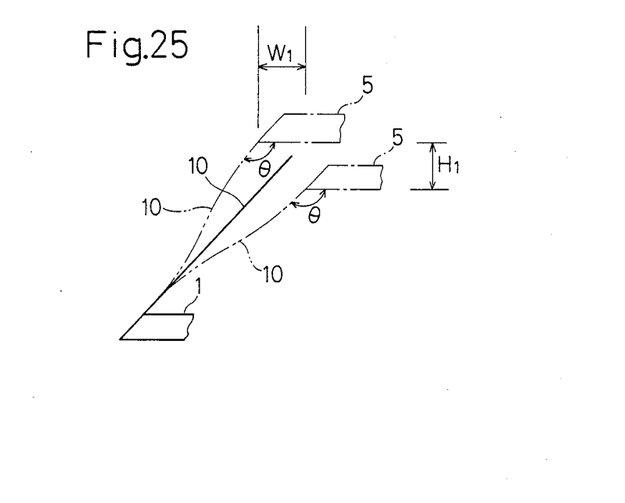
FIG. 25 is a diagram showing deformation of the vibration system including the bimorph cell assembly according to the prior art parts feeder.
Figure 26:
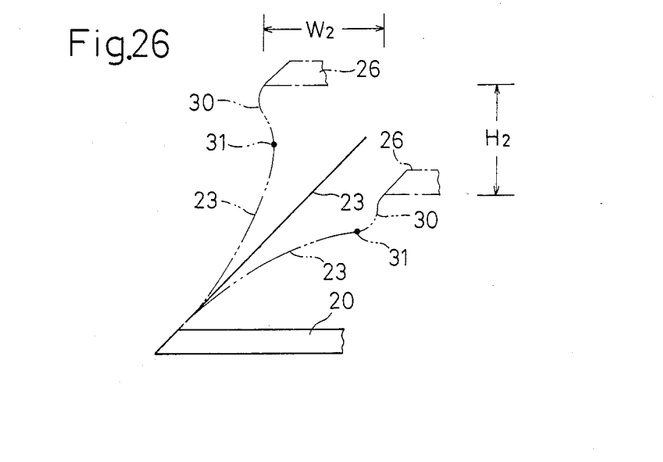
FIG. 26 is a diagram similar to FIG. 25 according to the present invention.

FIG. 25 shows deformation of the vibration system including the bimorph cell assembly and the trough in the prior art parts feeder in the case where the angle formed by the bimorph cell assembly 10 and the trough 5 does not change. FIG. 26 shows deformation of the vibration system including the bimorph cell assembly 22 and the trough 26 in the case where the bimorph cell assembly 22 and the trough 26 are connected by the connecting member 30 having low bending stiffness. In FIGS. 25 and 26, a solid line denotes a condition where no voltage is applied to the piezoelectric elements. A chain line denotes deformation of the vibration system in the came where the voltage of suitable value is applied. Reference symbols $W_1$ and $W_2$ denote horizontal vibration components. $H_1$ and $H_2$ denote vertical vibrating components. As evident from FIGS. 25 and 26, each connecting member 30 suffers larger deformation than each bimorph cell assembly 22 and the vibration amplitude of the trough 26 is increased as compared with that of the prior art.

Second, Third, Fourth and Fifth Embodiments (See FIGS. 4-8)

Figure 4:
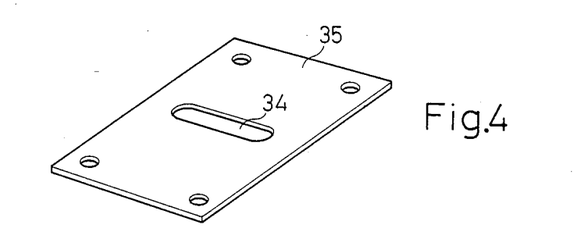
FIGS. 4 through 6 are perspective views of elastic connecting members employed in second, third and fourth embodiments respectively.

FIG. 4 illustrates a second embodiment of the invention. Each elastic connecting member 35 connecting each bimorph cell assembly 22 and the upper frame 28 has a slit 34 at the central portion. Each slit 34 extends in the direction perpendicular to the elongated direction of the connecting member 35.

Figure 5:
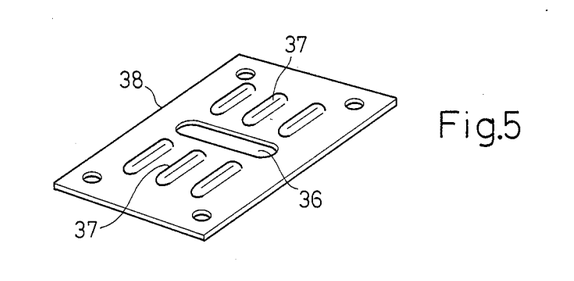

FIG. 5 shows a third embodiment. Each elastic connecting member 38 has a slit 36 at the central portion and ribs 37 on both sides of the slit 36 by means of stamping. Each connecting member 38 has lower stiffness in the vicinity of the slit 36 than in the vicinity of the ribs 37.

Figure 6:
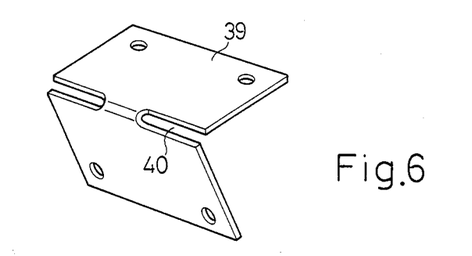
Figure 7:
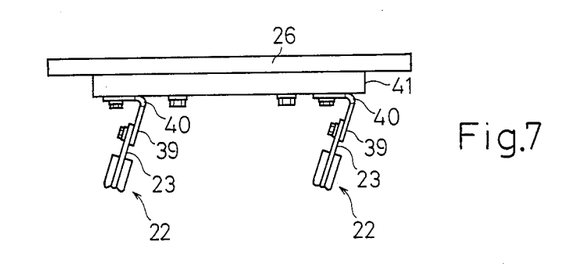
FIG. 7 is a partial side view of the parts feeder in which elastic connecting members in FIG. 6 are employed.

FIG. 6 shows a fourth embodiment. Each L-shaped connecting member 39 is utilized to connect each elastic plate 23 of the bimorph cell assemblies 22 and an upper frame 41 therewith as shown in FIG. 7.

Figure 8:
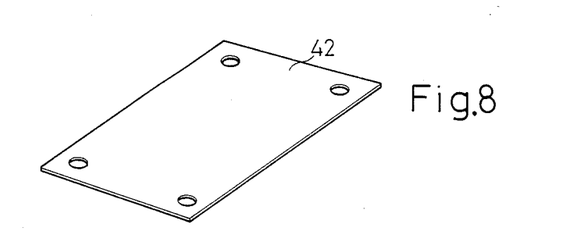
FIG. 8 is a perspective view of the elastic connecting member employed in a fifth embodiment.

FIG. 8 shows a fifth embodiment. Each rectangular connecting member 42 is made of the same material as that of the connecting member 30 in FIG. 3 and has the smaller thickness than that shown in FIG. 3, thereby securing its low stiffness. Each connecting member 42 may be made of a material having low Young's modulus. In case the material having low Young's modulus is used, the length of each connecting member may be made smaller, thereby providing a small-sized parts feeder. Where the steel leaf spring is used a the elastic plate 23 so that the connecting member having lower Young's modulus is attained, it is desirable that the connecting member be made of a copper alloy having elasticity such as phosphor bronze or beryllium copper, a resin having fine mechanical durability such as polycarbonate or polyetherimide a glass fiber reinforced plastic or carbon fiber reinforced plastic. Since these materials have low Young's modulus, the length of the connecting member can be reduced, thereby providing an apparatus of compact design.

Figure 9:
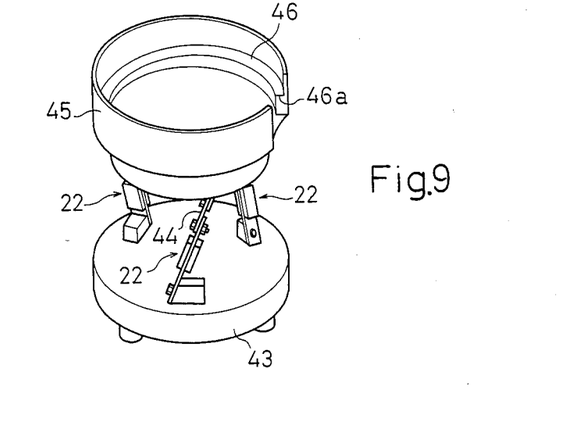
FIG. 9 is a perspective view of a parts feeder having a bowl-shaped container of a sixth embodiment.
Figure 10:
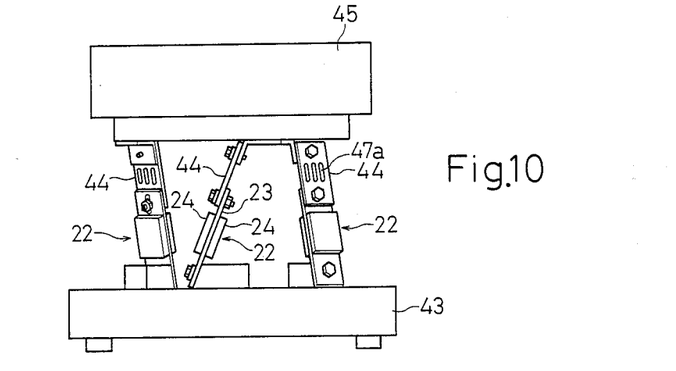
FIG. 10 is a side view of the parts feeder having a bowl-shaped container in FIG. 9.
Figure 11:
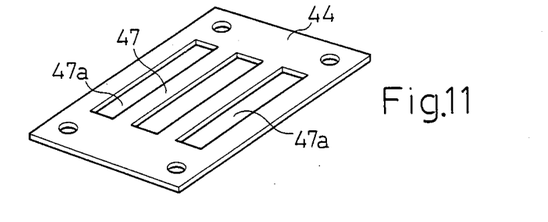
FIG. 11 is a perspective view of an elastic connecting member of the sixth embodiment.

Sixth Embodiment (See FIGS. 9–11)

FIGS. 9 through 11 illustrate a sixth embodiment of the invention. Three bimorph cell assemblies 22, for example, are fixed on a base 43 in a three-point arrangement and inclined in the direction of tangent lines touching a circle formed by the three points. The upper end of each bimorph cell assembly 22 and the underside of a bowl-shaped container 45 are respectively connected with each connecting member 44.

Figure 12:
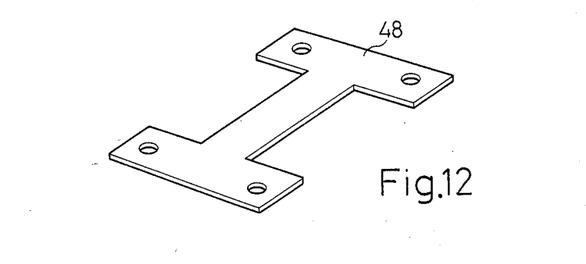
FIGS. 12 through 14 are perspective views of elastic connecting members employed in parts feeders having a bowl-shaped container of seventh, eighth and ninth embodiments respectively.
Figures 13, 14:
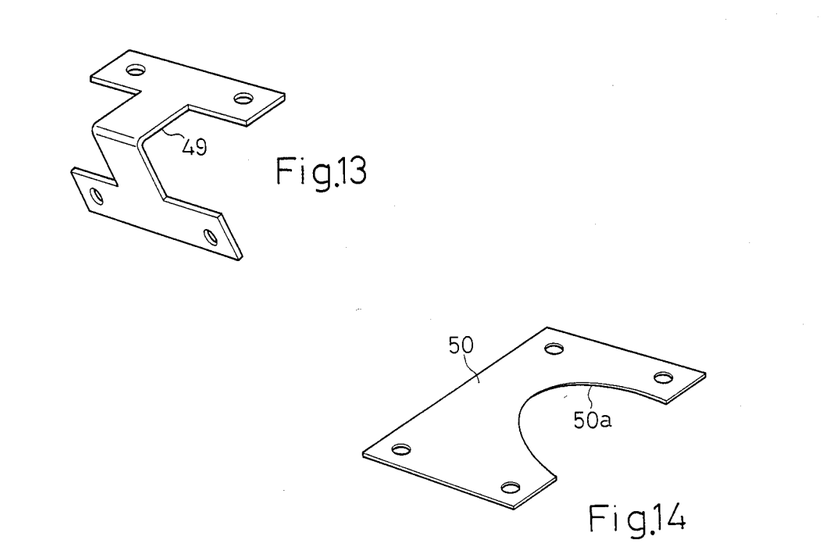

Vibration of each bimorph cell assembly 22 causes the container 45 containing articles to move up and down in the circumferential direction, thereby conveying the articles along a spiral passage 46 formed on the inside wall of the container 45 in the direction of an exit 46a. Each connecting member 47a employed in the sixth embodiment has a plurality of slits 47a extending in the elongated direction thereof, as shown in FIG. 11. The bending stiffness of the portion 7 in the direction of the twist movement is lower than that of the elastic plate 23 of the bimorph cell assembly 22, so that the load acting on the bimorph cell assembly 22 is decreased. If each connecting member 44 has higher stiffness than each elastic plate 23, the container 45 vibrates not only up and down but also in the circumferential direction. Consequently, the vibration of the container 45 in the circumferential direction causes the articles to drop back from the passage 46 into the bottom of the container 45. In this embodiment, however, the force vibrating the container 45 in the circumferential direction is absorbed by each connecting member 44 having low stiffness. Accordingly, the amplitude of the vibration component in the circumferential direction is decreased with respect to the container 45. Seventh, Eighth an Ninth Embodiments (See FIGS. 12–14):

Connecting members shown in FIGS. 12–14 may be employed in the part feeder having a bowl-shaped container. FIG. 12 illustrates a seventh embodiment. Each connecting member 48 has smaller width than the elastic plate 23 except margins thereof.

FIG. 18 illustrates an eighth embodiment. Each L-shaped connecting member 49 has the same configuration as the connecting member 48 in FIG. 12 when unfolded. Each connecting member 49 is incorporated in the parts feeder having a bowl-shaped container in the same manner as shown in FIG. 7.

FIG. 4 shows a ninth embodiment. Each connecting member 50 has a semicircular cut-out portion 50a at one of sides thereof, so that each connecting member 50 is asymmetric with respect to the vertical axis thereof. Each connecting member 50 is incorporated in the parts feeder having a bowl-shaped container in the same manner as shown in FIG. 10. In this case, particularly, each connecting member 50 is connected so that the semicircular cut-out portion 50a is located inside each bimorph cell assembly. According to this arrangement, the twisting stiffness of each connecting member 50 is decreased as well as the bending stiffness.

Figure 15:
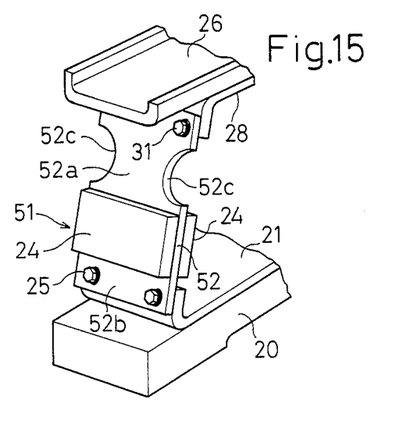
FIG. 15 is a fragmentary perspective view of parts feeder of a tenth embodiment.
Figure 16:
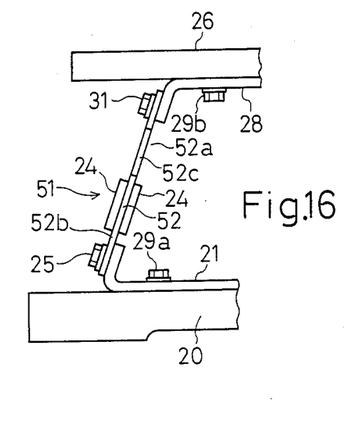
FIG. 16 is a partial side view of the parts feeder in FIG. 15.

FIGS. 15 and 16 illustrate a tenth embodiment. Each bimorph cell assembly 51 comprises an elastic plate 52 which is longer than the one shown in FIG. 1 and two piezoelectric elements 24 fixed thereto. Upper and lower ends of each elastic plate 52 are connected with upper an lower frames 28 and 21 by screws 31 and 35 respectively. Each elastic plate 52 has connecting strips 52a integrally extending from one end of each piezoelectric element 24 in the opposite direction. Each connecting strip 52a serves as a member for connecting the upper frame and each bimorph cell assembly therewith.

Figure 17:
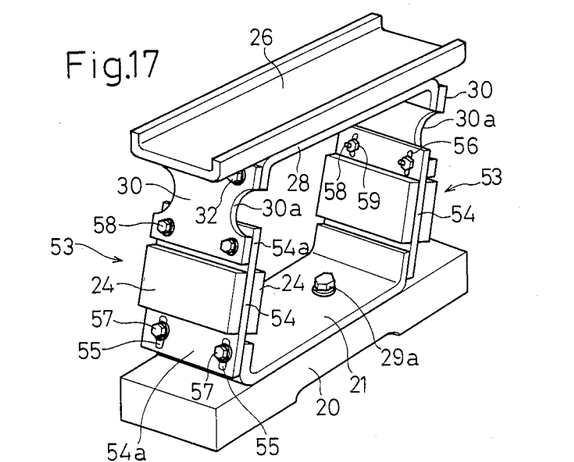
FIG. 17 is a perspective view of a parts feeder of an eleventh embodiment.
Figure 18:
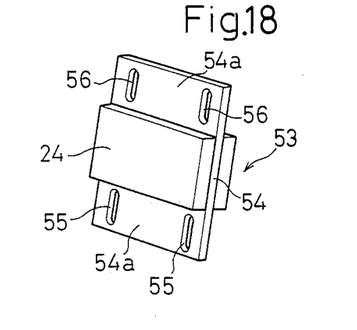
FIG. 18 is a perspective view of each bimorph cell assembly employed in the parts feeder in FIG. 17.

Semicircular cut-out portions 52c similar to those in FIG. 1 are formed at both side edges of each connecting strip 52a, thereby providing the vicinity of the cut-out portions 52c with low stiffness. Where the strip 52a has the same configurations as the connecting members in FIGS. 4–6 and FIGS. 11–13, it is possible to provide each connecting strip 52a with low stiffness. Eleventh and Twelfth Embodiments (See FIGS. 17–19):

FIGS. 17 and 18 show an eleventh embodiment. Both ends of elastic plate 54 of each bimorph cell assembly 53 project from both ends of each piezoelectric element 24 by a predetermined length, which projections serve as connecting portions 54a. Through openings 55 and 56 are formed in the connecting portions 54a respectively, each of the openings 55 and 56 extending in the elongated direction of each elastic plate 54. The lower end of each elastic plate 54 is connected with the lower frame 21 by a screw 57 which is received by the opening 55. The lower end of each connecting member 30 is connected with the upper end of each elastic plate 54 by a nut 59 and screw 58 received by the opening 56.

As described above, it is required that AC voltage applied to the piezoelectric elements 24 should have the same frequency as the natural frequency of the vibration system including the connecting members 30 in order to improve the feeding efficiency. However, the elastic plate 54 of the bimorph cell assembly 26 has variations in thickness, length and Young's modulus thereof within the range of predetermined tolerances. The connecting member 30 also has variations within the range of predetermined tolerances. Consequently, it is inevitable that the natural frequency of the vibration system varies product to product, so that the vibration amplitude of the bimorph cell assembly is decreased. In the construction in FIG. 17, however, the openings 55 and 56 are provided at both ends of each elastic plate 54. The location of connection where each elastic plate 54 is connected with the lower frame 21 by screws 57 and 58 are adjustable, which enables adjustment of effective length of the vibration system including the elastic plates 54. As a result, the natural frequency of each elastic plate 54 may be set at a suitable value so that the frequency of AC voltage resonates thereto.

Figure 19:
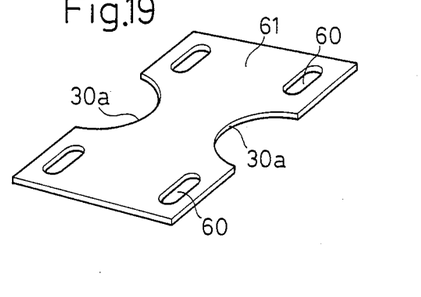
FIG. 19 is a perspective view of each elastic connecting member employed in a parts feeder of a twelfth embodiment.

FIG. 19 illustrates twelfth embodiment. Instead of the connecting members 80 in FIG. 17, this embodiment employs connecting members 61 each having elongated slits 60 to adjust effective length of the vibration system. Furthermore, round openings may replace the elongated slits 55 and 56 of the elastic plate 54 in FIG. 17.

Although elongated slits are provided for adjusting the effective length of the vibration system, as described above, round openings each having a larger diameter than the external diameter of the screw to be received may be provided. Furthermore, the above-described means for adjusting the natural frequency of the vibration system may be employed in the parts feeder having a bowl-shaped container shown in FIG. 9.

Since the vibration amplitude of the bimorph cell assembly in every above-described embodiment is approximately 0.3 mm long, it is important that the vibration should not be absorbed at the inside of each lapped portion where the elastic plate of each bimorph cell assembly is lapped with another member and connected thereto. In order to prevent such absorption of vibration, the members should be connected after removing anticorrosive paint film from lapped surfaces thereof. In this case, anticorrosive oil may be applied to the surfaces from which anticorrosive paint film is removed, which does not cause absorption of vibration.

Although each vibration generator comprises an elastic plate and two piezoelectric elements each fixed on respective sides of the elastic plate in the above-described embodiments, one piezoelectric element may be fixed on either side of each elastic plate. Furthermore, a plurality of laminations of piezoelectric elements may be employed. Each connecting member may be formed integrally with the upper frame or other members of the conveying means.

As described above, the piezoelectric drive type parts feeding apparatus of this invention is characterized in that each elastic connecting member connecting the elastic plate of each vibration generator and the conveying means therewith has a lower bending stiffness than each elastic plate, thereby decreasing the load applied to each piezoelectric element. As a result, the vibration amplitude of the conveying means is increased so that available feeding efficiency for practical use can be obtained. Furthermore, this invention provides a parts feeding apparatus wherein the effective length of the vibration system is adjusted so that the natural frequency thereof resonates to the frequency of voltage applied to the piezoelectric elements.

What is claimed is:

1. In a parts feeding apparatus of the piezoelectric drive type wherein a conveying means is vibrated by a plurality of vibration generators each consisting of an elastic plate and at least a piezoelectric element fixed on either side of the elastic plate to feed articles placed on the conveying means, the improvement comprising a plurality of connecting members each made of an elastic material for connecting between the elastic plate of each vibration generator and the conveying means, said each connecting member having lower stiffness than the elastic plate of each vibration generator.

2. A parts feeding apparatus of the piezoelectric drive type as set forth in claim 1, wherein said each connecting member has lower Young's modulus than the elastic plate of each vibration generator.

3. A parts feeding apparatus of the piezoelectric drive type as set forth in claim 1, wherein said each connecting member has a rectangular plate shape and one or more cut-out portions therein so that the stiffness thereof is decreased.

4. A parts feeding apparatus of the piezoelectric drive type as set forth in claim 1, wherein said each connecting member has a rectangular plate shape and one or more slits so that the stiffness thereof is decreased.

5. A parts feeding apparatus of the piezoelectric drive type as set forth in claim 1, wherein said each connecting member has a rectangular plate shape and a predetermined thickness so that tee stiffness thereof is decreased.

6. A parts feeding apparatus of the piezoelectric drive type as set forth in claim 1, wherein said each connecting member is formed integrally with the elastic plate of each vibration generator, said each connecting member having one or more cut-out portions therein so that the stiffness thereof is decreased.

7. A parts feeding apparatus of the piezoelectric drive type as set forth in claim 1, wherein said each connecting member is formed integrally with the elastic plate of each vibration generator, said each connecting member having one or more slits so that the stiffness thereof is decreased.

8. In a parts feeding apparatus of the piezoelectric drive type wherein a conveying means having a spiral passage for feeding articles therealong is vibrated by a plurality of vibration generators each consisting of an elastic plate and at least a piezoelectric element fixed on either side of each elastic plate so that the conveying means is vibrated by the vibration generators up and down in the circumferential direction, the improvement comprising a plurality of connecting members each connecting between each vibration generator and the conveying means, said each connecting member having an asymmetric configuration with respect to the vertical axis thereof so as to have lower stiffness than each vibration generator.

9. In a parts feeding apparatus of the piezoelectric drive type wherein a conveying means is vibrated by a plurality of vibration generators each consisting of an elastic plate and at least a piezoelectric element fixed on either side of the elastic plate. The improvement comprising a plurality of connecting members with which the conveying means and each vibration generators are connected by screws received by through opening formed in said connecting members so that the natural frequency of the vibration system is adjusted, said each through opening having a larger inner diameter than the external diameter of each screw so that the effective length of the vibration system is adjusted.

10. A parts feeding apparatus comprising:
   a. conveying means for conveying parts along a feed path;
   b. generation means for generating vibration, said generation means comprising a plurality of elastic plates and at least one piezoelectric element fixed to a side of said elastic plates; and
   c. connecting means comprising an elastic material for providing a connection between said elastic plates of said generation means and said conveying means, said connecting means having a stiffness lower than said elastic plates.

11. A parts feeding apparatus as claimed in claim 10, wherein said connecting means is connected to said elastic plates and said conveying means by screws received through openings formed in said connecting means so that the natural frequency of the apparatus is adjusted, said through openings having a larger inner diameter than the external diameter of said screws.

12. A parts feeding apparatus as claimed in claim 10 further comprising means for providing an electrical connection to said piezoelectric element.

* * * * *